US012645391B2

(12) United States Patent
Cariello

(10) Patent No.: US 12,645,391 B2
(45) **Date of Patent: \*Jun. 2, 2026**

(54) READ LATENCY AND SUSPEND MODES

(71) Applicant: Micron Technology, Inc., Boise, ID (US)

(72) Inventor: Giuseppe Cariello, Boise, ID (US)

(73) Assignee: Micron Technology, Inc., Bosie, ID (US)

( \* ) Notice: Subject to any disclaimer, the term of this patent is extended or adjusted under 35 U.S.C. 154(b) by 0 days.

This patent is subject to a terminal disclaimer.

(21) Appl. No.: 18/765,072

(22) Filed: Jul. 5, 2024

(65) Prior Publication Data

US 2025/0004664 A1 Jan. 2, 2025

Related U.S. Application Data

(63) Continuation of application No. 17/395,295, filed on Aug. 5, 2021, now Pat. No. 12,045,495.

(51) Int. Cl.
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
CPC .............................. G06F 3/0655; G06F 3/0604
See application file for complete search history.

(56) References Cited

U.S. PATENT DOCUMENTS 8,601,214 B1 \* 12/2013 Chakalian ............. G06F 16/172
                                                       711/143
10,684,964 B1   6/2020 Gordon et al.
2013/0205085 A1  8/2013 Hyun et al.
                 (Continued)

FOREIGN PATENT DOCUMENTS

CN     105264505 A    1/2016
CN     110362507 A   10/2019
             (Continued)

OTHER PUBLICATIONS

Chinese patent office, "China Office Action," issued in connection with China Patent Application No. 202210931380.5 dated Nov. 19, 2025 (27 pages) (14 pages of English Translation and 13 pages of Original Document).

*Primary Examiner* — Nicholas A. Paperno
(74) *Attorney, Agent, or Firm* — Holland & Hart LLP

(57) ABSTRACT

Methods, systems, and devices for read latency and suspend modes are described. A memory system may operate in a first mode of operation associated with a first set of access operations including executing read operations, executing write operations, and suspending write operations. The memory system may receive, from a host system, an indication to switch to a second mode of operation associated with a decreased latency for executing write operations based on limiting a suspension of write operations. For example, the host system may transmit a command including the indication to switch to the second mode of operation. In another example, the host system may write a value to a register at the memory system including the indication to switch to the second mode of operation. Based on receiving the indication from the host system, the memory system may then operate according to the second mode of operation.

20 Claims, 7 Drawing Sheets

(56)       References Cited

U.S. PATENT DOCUMENTS

| | | | |
|---|---|---|---|
| 2019/0080733 A1 | 3/2019 | Mirichigni et al. | |
| 2019/0317895 A1 | 10/2019 | Jung et al. | |
| 2020/0004673 A1 | 1/2020 | D'Eliseo et al. | |
| 2020/0026465 A1* | 1/2020 | Jung ................... | G06F 12/0246 |
| 2021/0096985 A1 | 4/2021 | Kim et al. | |
| 2021/0248094 A1 | 8/2021 | Norman et al. | |

FOREIGN PATENT DOCUMENTS

| | | |
|---|---|---|
| CN | 112470132 A | 3/2021 |
| KR | 10-2088944 B1 | 5/2020 |

\* cited by examiner

Figure 3:
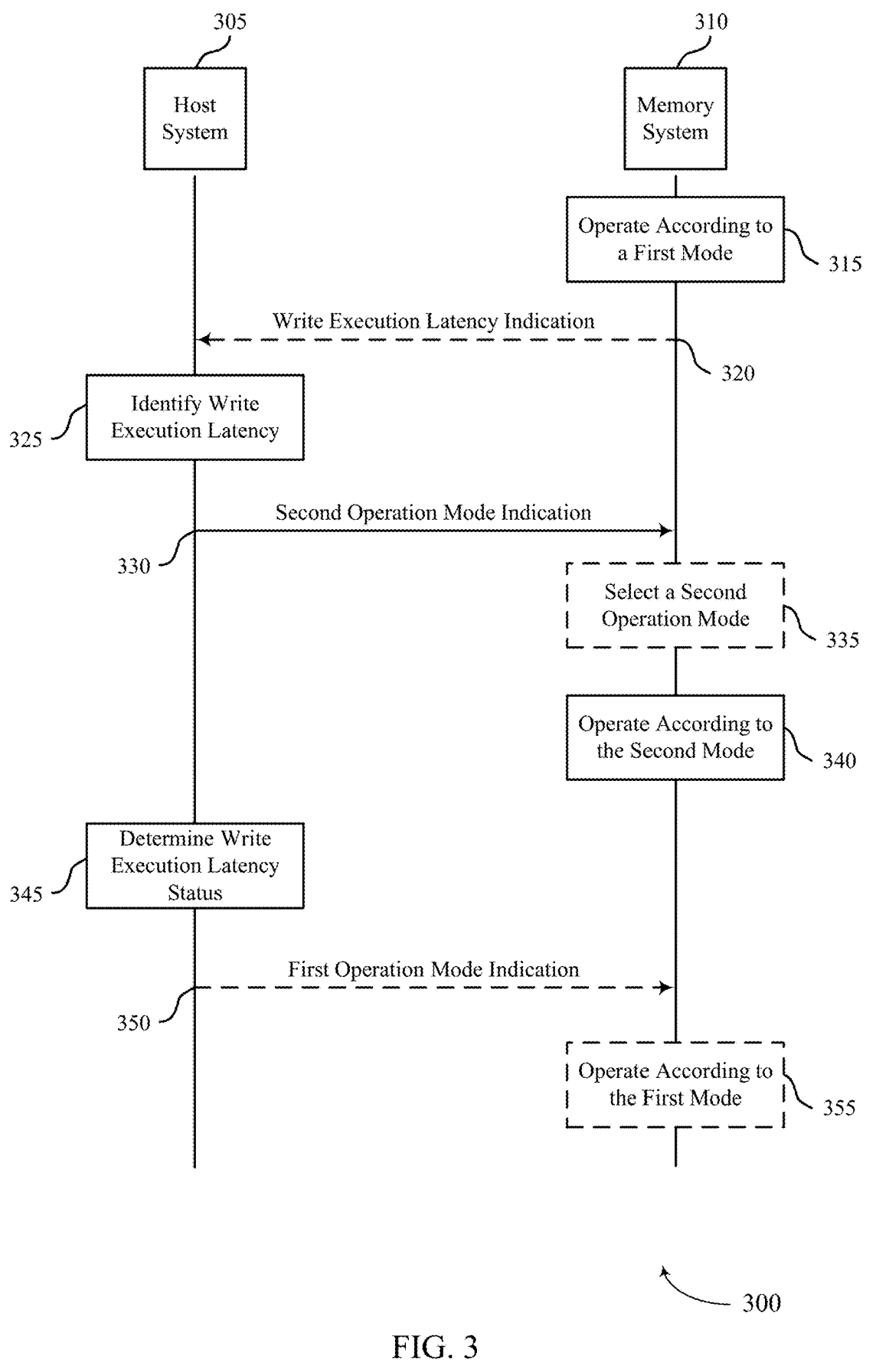

305

Host
System

310

Memory
System

Operate According to
a First Mode — 315

Write Execution Latency Indication
← - - - - - - - - - - - - - - - - - - - - - - - - - 320

325 — Identify Write
Execution Latency

Second Operation Mode Indication
- - - - - - - - - - - - - - - - - - - - →
330

Select a Second
Operation Mode — 335

Operate According to
the Second Mode — 340

Determine Write
Execution Latency
Status
345

First Operation Mode Indication
- - - - - - - - - - - - - - - - - - - - - →
350

Operate According to
the First Mode — 355

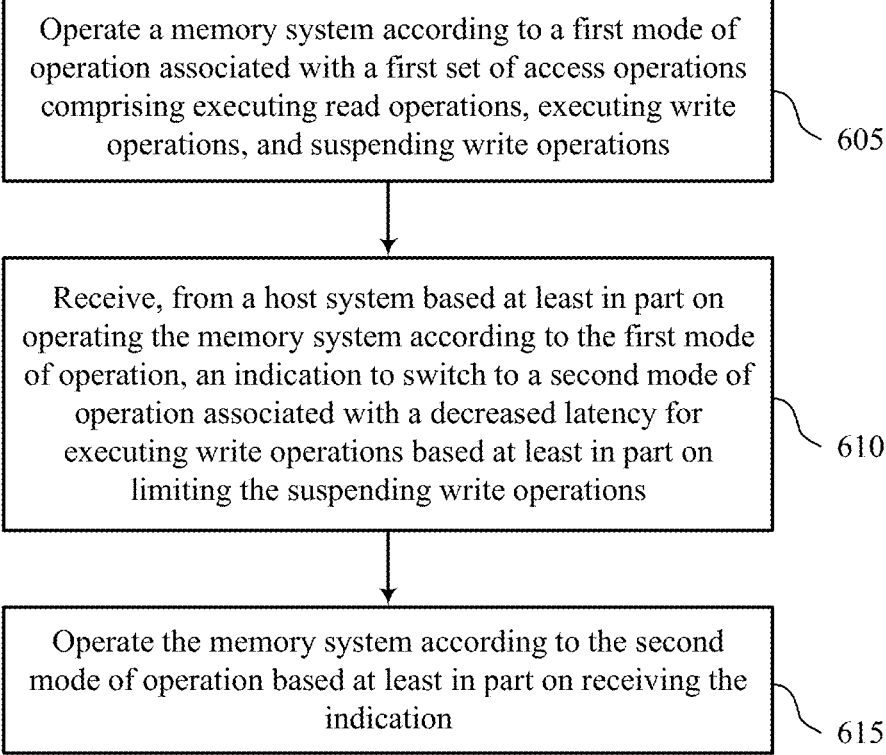

Operate a memory system according to a first mode of operation associated with a first set of access operations comprising executing read operations, executing write operations, and suspending write operations

605

Receive, from a host system based at least in part on operating the memory system according to the first mode of operation, an indication to switch to a second mode of operation associated with a decreased latency for executing write operations based at least in part on limiting the suspending write operations

610

Operate the memory system according to the second mode of operation based at least in part on receiving the indication

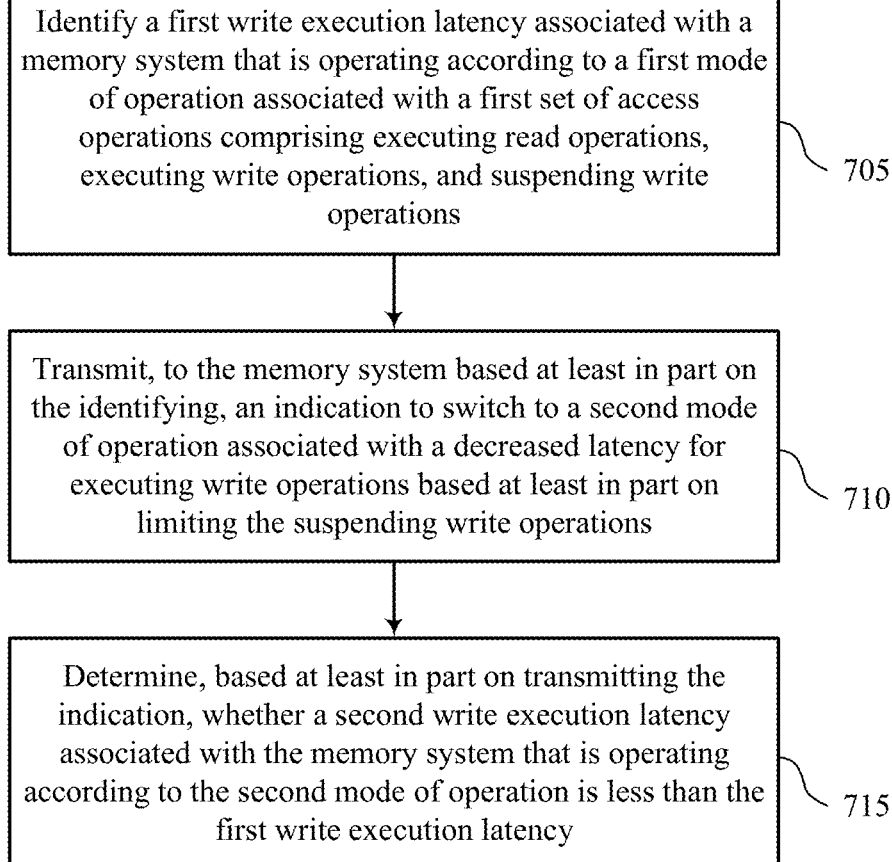

Identify a first write execution latency associated with a memory system that is operating according to a first mode of operation associated with a first set of access operations comprising executing read operations, executing write operations, and suspending write operations

705

Transmit, to the memory system based at least in part on the identifying, an indication to switch to a second mode of operation associated with a decreased latency for executing write operations based at least in part on limiting the suspending write operations

710

Determine, based at least in part on transmitting the indication, whether a second write execution latency associated with the memory system that is operating according to the second mode of operation is less than the first write execution latency

READ LATENCY AND SUSPEND MODES

CROSS REFERENCE

The present Application for Patent is a continuation of U.S. patent application Ser. No. 17/395,295 by Cariello, entitled "READ LATENCY AND SUSPEND MODES," filed Aug. 5, 2021, which is assigned to the assignee hereof, and is expressly incorporated by reference herein.

FIELD OF TECHNOLOGY

The following relates generally to one or more systems for memory and more specifically to read latency and suspend modes.

BACKGROUND

Memory devices are widely used to store information in various electronic devices such as computers, user devices, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not- or (NOR) and not- and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

BRIEF DESCRIPTION OF THE DRAWINGS

FIG. 3 illustrates an example of a process flow that supports read latency and suspend modes in accordance with examples as disclosed herein.

FIGS. 6 and 7 show flowcharts illustrating a method or methods that support read latency and suspend modes in accordance with examples as disclosed herein.

DETAILED DESCRIPTION

A memory system may perform various types of access operations. For example, the memory system may perform read operations, write operations, erase operations, or any combination thereof. In some examples, write operations and erase operations may take more time to execute compared to read operations. For example, in some not- and (NAND) devices, executing a some write operations (e.g., a tri-level cell (TLC) program) or erase operations (e.g., a TLC erase) may take several milliseconds (ms), while a read operation may be executed in tens of microseconds ($\mu$s). In some cases, executing write or erase operations may thus introduce latency to read operation execution. To decrease read operation latencies introduced by write and erase operations, the memory system may suspend an execution of a write or erase operations to execute read operations (e.g., during a program suspend mode). To execute the read operation as soon as possible and reduce a latency associated with executing the read operation, a memory system may reduce suspend latency (e.g., interrupt an ongoing write or erase operation and make a memory array available for the read operation in a relatively fast amount of time). Additionally, a latency of the suspended operation may be increased by the suspend time (e.g., the time in which the operation is suspended) and a time associated with preparing suspension and resuming the operation. Suspending an execution of write and erase operations in a relatively fast way, may be associated with a program or erase algorithm to back up on resume (e.g., to repeat the last interrupted step or, in some circumstances more steps), and increase the latency associated with the interrupted operation execution. In some instances (e.g., video recording), this increased latency associated with write operation execution may impact a user experience of the application (e.g., result in a loss of frames, cause a degradation of the video quality).

As described herein, a memory system may operate according to a mode that decreases a latency associated with write operations. For example, the memory system may operate according to a mode of operation that limits the suspension of write and erase operations (e.g., thus decreasing the write execution latency). In some cases, the memory system may operate according to this mode of operation in response to receiving an indication from the host system. For example, the host system may transmit a command or set a flag indicating for the memory system to operate according to the mode of operation associated with the decreased write operation latency. Here, the memory system may switch from a first mode of operation (e.g., where the suspension of write operations is not limited) to a second mode of operation based on or in response to receiving the indication from the host system. Switching between modes of operation may increase a performance of the memory system and improve a user's experience.

Figure 1:
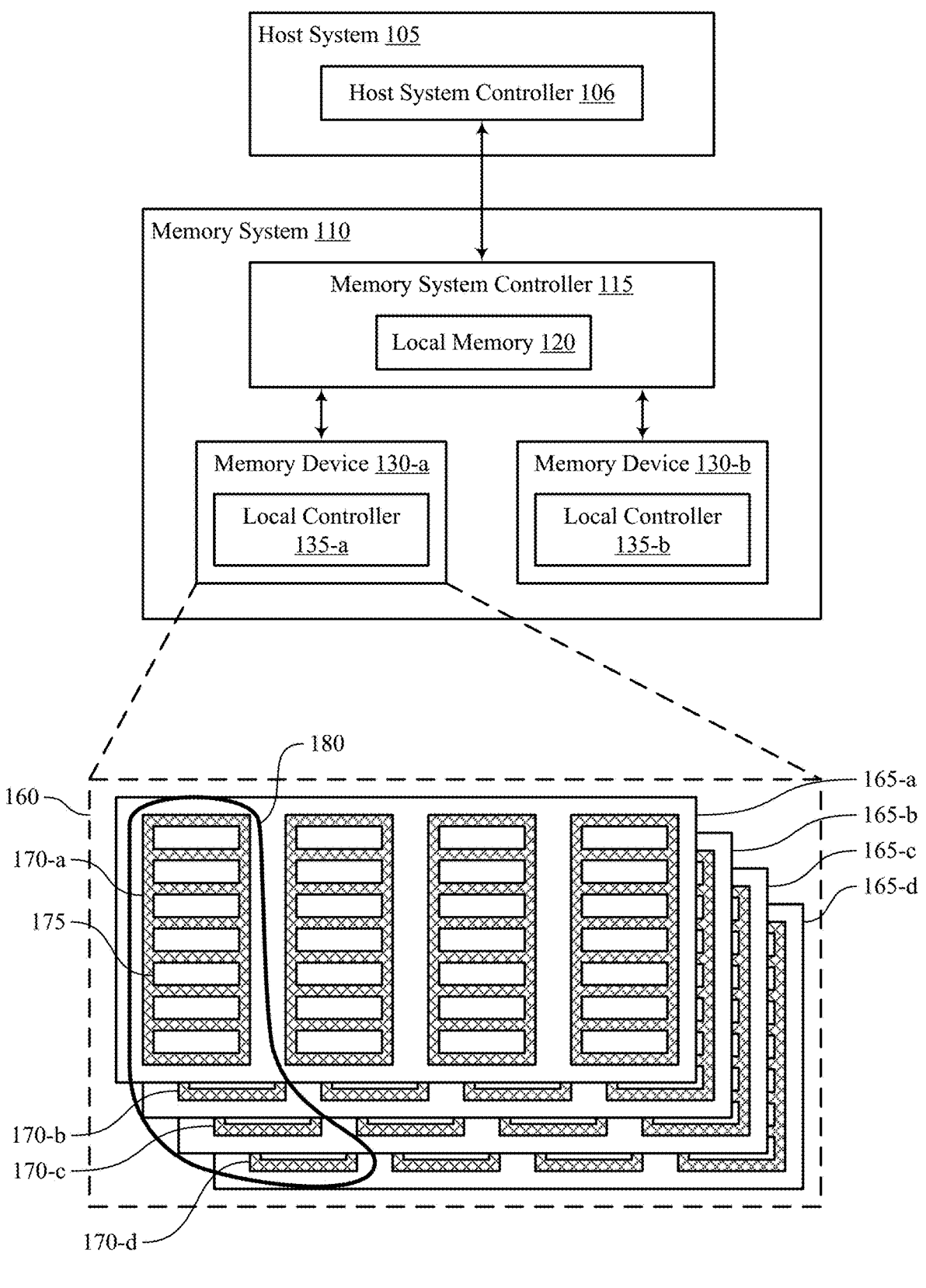
FIG. 1 illustrates an example of a system that supports read latency and suspend modes in accordance with examples as disclosed herein.
Figure 2:
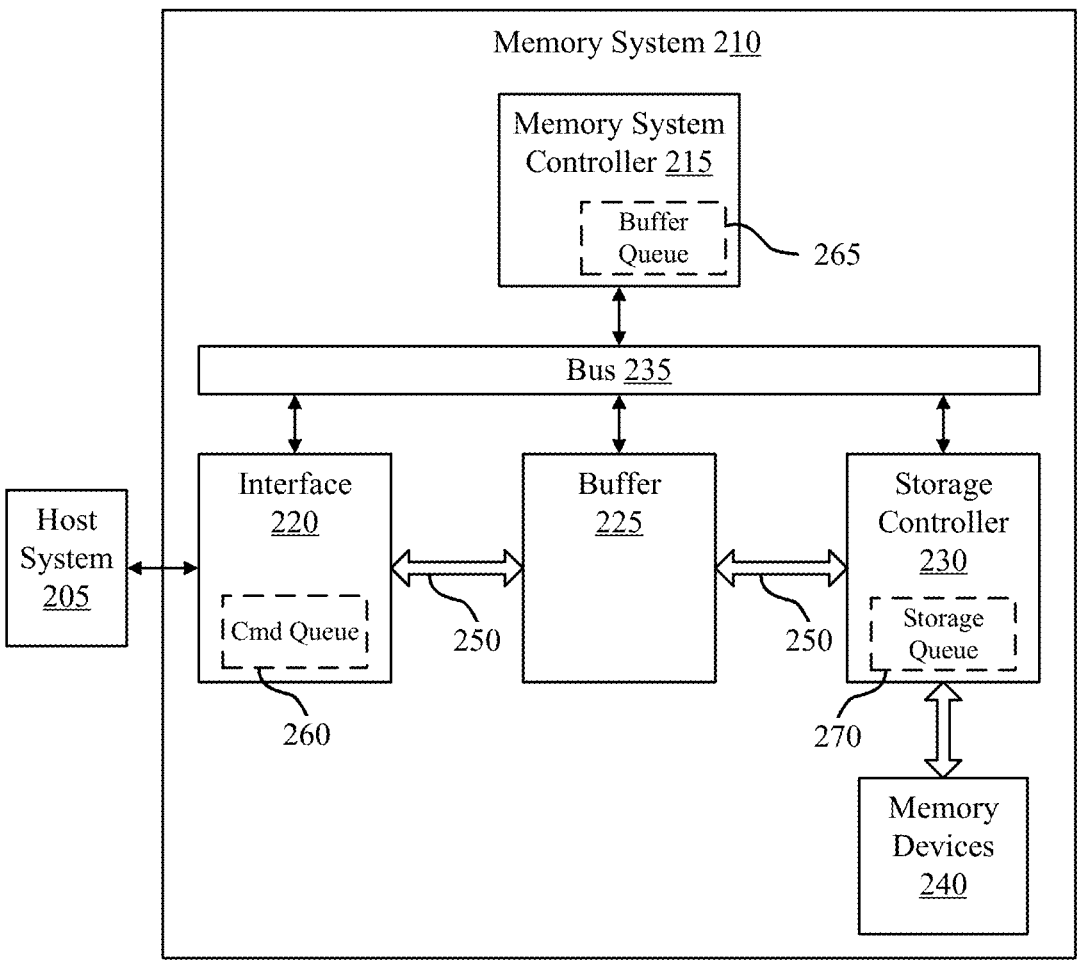
FIG. 2 illustrates an example of a system that supports read latency and suspend modes in accordance with examples as disclosed herein.

Features of the disclosure are initially described in the context of systems with reference to FIGS. 1 and 2. Features of the disclosure are described in the context of a process flow with reference to FIG. 3. These and other features of the disclosure are further illustrated by and described in the context of an apparatus diagram and flowchart that relate to read latency and suspend modes with reference to FIGS. 4-7.

FIG. 1 illustrates an example of a system 100 that supports read latency and suspend modes in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-*a* and 130-*b* are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may in some cases instead be performed by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magnetic RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as TLCs if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block 180 may include blocks 170 from different memory devices 130 (e.g., including blocks 170 in one or more planes 165 of memory device 130-a and memory device 130-b). In some cases, the blocks 170 within a virtual block 180 may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation).

Further, in some cases, NAND memory cells may be erased before they can be re-written with new data. Thus, for example, a used page 175 may in some cases not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages 175 of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

The system 100 may include any quantity of non-transitory computer readable media that support read latency and suspend modes. For example, the host system 105, the memory system controller 115, or a memory device 130 may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system 110 that may include, for example, one or more memory arrays and related circuitry combined with a local (e.g., on-die or in-package) controller (e.g., local controller 135). An example of a managed memory system 110 is a managed NAND (MNAND) system.

In some cases, the memory system controller 115 or a local controller 135 may adjust an operation of the memory system 110 based on or in response to a workload associated with the memory system 110 (e.g., a based on or in response to a queue of operations to be executed by the memory system 110). That is, the memory system controller 115 or the local controller 135 may operate the memory system 110 differently in cases of performing multiple read operations (e.g., random read operations) versus performing multiple write operations. In some instances, the memory system controller 115 or the local controller 135 (e.g., executing a firmware of the memory system 110) may reorganize resources based on or in response to the workload associated with the memory system 110. That is, the memory system controller 115 or the local controller 135 may reallocate SRAM from a buffer (e.g., at the memory system 110) to a table cache, prefetch data, enable deeper pipelines, or perform other operations to reorganize resources based on or in response to the workload associated with the memory system 110.

In some examples, the memory system controller 115 or a local controller 135 may selectively suspend an execution of write and erase operations for a memory device 130 (e.g., by entering a program suspend mode). That is, executing write and erase operations at the memory device 130 may take more time compared to executing read operations at the memory device 130. For example, executing a write operation at the memory device 130 may take between one and twenty ms while executing a read operation may take around ten μs. By entering the program suspend mode, the memory system controller 115 or the local controller 135 may suspend write and erase operations while continuing to execute read operations at the memory device 130. Thus, a read execution latency associated with the memory device 130 may decrease during the program suspend mode.

In some instances, the memory system controller 115 or the local controller 135 may enter the program suspend mode based on or in response to a preconfigured setting. For example, the memory system 110 may enter the program suspend mode based on or in response to a hardcoded setting in the firmware of the memory system 110. In cases of a mixed workload (e.g., the memory system 110 has read operations, write operations, and erase operations to execute), entering the program suspend mode according to the preconfigured setting may not improve an overall performance of the memory system 110. That is, in cases that the memory system 110 is executing operations associated with a large quantity of write operations (e.g., video recording), entering the program suspend mode according to the preconfigured setting may significantly impact the performance of the memory system 110 and the user experience.

In the example of system 100, the host system 105 may be configured to indicate, to the memory system 110, to operate according to a mode of operation associated with a decreased write operation latency. For example, in cases that the host system 105 is relying on the memory system 110 to perform a workload associated with more write operations than read operations (e.g., for video recording), the host system 105 may indicate for the memory system 110 to operate according to the mode of operation associated with the decreased write operation latency. In response to the memory system 110 receiving, from the host system 105, the indication to operate according to the mode of operation associated with decreased write operation latency, the memory system 110 may switch from a first mode of operation (e.g., associated with entering the program suspend mode according to a preconfigured setting) to a second mode of operation (e.g., associated with limiting the suspension of write operations). Thus, the memory system 110 performance may improve (e.g., by limiting the suspension of write operations). In some cases, the host system 105 may subsequently indicate, to the memory system 110, to switch back to the first mode of operation where the memory system 110 enters the program suspend mode according to the preconfigured setting.

FIG. 2 illustrates an example of a system 200 that supports read latency and suspend modes in accordance with examples as disclosed herein. The system 200 may be an example of a system 100 as described with reference to FIG. 1 or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include memory devices 240 to store data transferred between the memory system 210 and the host system 205, e.g., in response to receiving access commands from the host system 205, as described herein. The memory devices 240 may include one or more memory devices as described with reference to FIG. 1. For example, the memory devices 240 may include NAND memory, PCM, self-selecting memory, 3D cross point, other chalcogenide-based memories, FERAM, MRAM, NOR (e.g., NOR flash) memory, STT-MRAM, CBRAM, RRAM, or OxRAM.

The memory system 210 may include a storage controller 230 for controlling the passing of data directly to and from the memory devices 240, e.g., for storing data, retrieving data, and determining memory locations in which to store data and from which to retrieve data. The storage controller 230 may communicate with memory devices 240 directly or via a bus (not shown) using a protocol specific to each type of memory device 240. In some cases, a single storage controller 230 may be used to control multiple memory devices 240 of the same or different types. In some cases, the memory system 210 may include multiple storage controllers 230, e.g., a different storage controller 230 for each type of memory device 240. In some cases, a storage controller 230 may implement aspects of a local controller 135 as described with reference to FIG. 1.

The memory system 210 may additionally include an interface 220 for communication with the host system 205 and a buffer 225 for temporary storage of data being transferred between the host system 205 and the memory devices 240. The interface 220, buffer 225, and storage controller 230 may be for translating data between the host system 205 and the memory devices 240, e.g., as shown by a data path 250, and may be collectively referred to as data path components.

Using the buffer 225 to temporarily store data during transfers may allow data to be buffered as commands are being processed, thereby reducing latency between commands and allowing arbitrary data sizes associated with commands. This may also allow bursts of commands to be handled, and the buffered data may be stored or transmitted (or both) once a burst has stopped. The buffer 225 may include relatively fast memory (e.g., some types of volatile memory, such as SRAM or DRAM) or hardware accelerators or both to allow fast storage and retrieval of data to and from the buffer 225. The buffer 225 may include data path switching components for bi-directional data transfer between the buffer 225 and other components.

The temporary storage of data within a buffer 225 may refer to the storage of data in the buffer 225 during the execution of access commands. That is, upon completion of an access command, the associated data may no longer be maintained in the buffer 225 (e.g., may be overwritten with data for additional access commands). In addition, the buffer 225 may be a non-cache buffer. That is, data may not be read directly from the buffer 225 by the host system 205. For example, read commands may be added to a queue without an operation to match the address to addresses already in the buffer 225 (e.g., without a cache address match or lookup operation).

The memory system 210 may additionally include a memory system controller 215 for executing the commands received from the host system 205 and controlling the data path components in the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, and a storage queue 270) may be used to control the processing of the access commands and the movement of the corresponding data. This may be beneficial, e.g., if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if used, may be positioned anywhere within the memory system 210.

Data transferred between the host system 205 and the memory devices 240 may take a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220, e.g., according to a protocol (e.g., a UFS protocol or an eMMC protocol). Thus, the interface 220 may be considered a front end of the memory system 210. Upon receipt of each access command, the interface 220 may communicate the command to the memory system controller 215, e.g., via the bus 235. In some cases, each command may be added to a command queue 260 by the interface 220 to communicate the command to the memory system controller 215.

The memory system controller 215 may determine whether an access command has been received based on or in response to the communication from the interface 220. In some cases, the memory system controller 215 may determine that the access command has been received by retrieving the command from the command queue 260. The command may be removed from the command queue 260 after it has been retrieved therefrom, e.g., by the memory system controller 215. In some cases, the memory system controller 215 may cause the interface 220, e.g., via the bus 235, to remove the command from the command queue 260.

Upon the determination that an access command has been received, the memory system controller 215 may execute the access command. For a read command, this may mean obtaining data from the memory devices 240 and transmitting the data to the host system 205. For a write command, this may mean receiving data from the host system 205 and moving the data to the memory devices 240. In some cases, the memory system controller 215 may determine that the access command has not been received and may not execute the access command.

In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may first determine whether the buffer 225 has sufficient available space to store the data associated with the command. For example, the memory system controller 215 may determine, e.g., via firmware (e.g., controller firmware), whether an amount of space within the buffer 225 is available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. That is, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), e.g., according to a protocol (e.g., a UFS protocol or an eMMC protocol). As the interface 220 subsequently receives from the host system 205 the data associated with the write command, the interface 220 may transfer the data to the buffer 225 for temporary storage using the data path 250. In some cases, the interface 220 may obtain from the buffer 225 or buffer queue 265 the location within the buffer 225 to store the data. The interface 220 may indicate to the memory system controller 215, e.g., via the bus 235, if the data transfer to the buffer 225 has been completed.

Once the write data has been stored in the buffer 225 by the interface 220, the data may be transferred out of the buffer 225 and stored in a memory device 240. This may be done using the storage controller 230. For example, the memory system controller 215 may cause the storage controller 230 to retrieve the data out of the buffer 225 using the data path 250 and transfer the data to a memory device 240.

The storage controller 230 may be considered a back end of the memory system 210. The storage controller 230 may indicate to the memory system controller 215, e.g., via the bus 235, that the data transfer to a memory device of the memory devices 240 has been completed.

In some cases, a storage queue 270 may be used to aid with the transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain from the buffer 225, buffer queue 265, or storage queue 270 the location within the buffer 225 from which to obtain the data. The storage controller 230 may manage the locations within the memory devices 240 to store the data (e.g., performing wear-leveling, garbage collection, and the like). The entries may be added to the storage queue 270, e.g., by the memory system controller 215. The entries may be removed from the storage queue 270, e.g., by the storage controller 230 or memory system controller 215 upon completion of the transfer of the data.

To process a read command received from the host system 205, the memory system controller 215 may again first determine whether the buffer 225 has sufficient available space to store the data associated with the command. For example, the memory system controller 215 may determine, e.g., via firmware (e.g., controller firmware), whether an amount of space within the buffer 225 is available to store data associated with the read command.

In some cases, the buffer queue 265 may be used to aid with buffer storage of data associated with read commands in a similar manner as discussed above with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215, e.g., via the bus 235, if the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain from the buffer 225 or storage queue 270 the location within the memory devices 240 from which to retrieve the data. In some cases, the storage controller 230 may obtain from the buffer queue 265 the location within the buffer 225 to store the data. In some cases, the storage controller 230 may obtain from the storage queue 270 the location within the buffer 225 to store the data. In some cases, the memory system controller 215 may move the command processed by the storage queue 270 back to the command queue 260.

Once the data has been stored in the buffer 225 by the storage controller 230, the data may be transferred out of the buffer 225 and sent to the host system 205. For example, the memory system controller 215 may cause the interface 220 to retrieve the data out of the buffer 225 using the data path 250 and transmit the data to the host system 205, e.g., according to a protocol (e.g., a UFS protocol or an eMMC protocol). For example, the interface 220 may process the command from the command queue 260 and may indicate to the memory system controller 215, e.g., via the bus 235, that the data transmission to the host system 205 has been completed.

The memory system controller 215 may execute received commands according to an order (e.g., a first-in, first-out order, according to the order of the command queue 260). For each command, the memory system controller 215 may cause data corresponding to the command to be moved into and out of the buffer 225, as discussed above. As the data is moved into and stored within the buffer 225, the command may remain in the buffer queue 265. A command may be removed from the buffer queue 265, e.g., by the memory system controller 215, if the processing of the command has been completed (e.g., if data corresponding to the access command has been transferred out of the buffer 225). If a command is removed from the buffer queue 265, the address previously storing the data associated with that command may be available to store data associated with a new command.

In some cases, the memory system controller 215 may adjust an operation of the memory system 210 based on or in response to the commands within the command queue 260 (e.g., based on or in response to a workload associated with the memory system 210. That is, the memory system controller 215 may operate the memory system 210 differently in cases of performing multiple random read operations versus performing multiple write operations. In some instances, the memory system controller 215 (e.g., executing a firmware of the memory system 210) may reorganize resources based on or in response to the workload associated with the memory system 210. That is, the memory system controller 215 may reallocate SRAM from the buffer 225 to a table cache, prefetch data (e.g., from the memory devices 240), enable deeper pipelines, or perform other operations to reorganize resources based on or in response to the commands in the command queue 260.

In some examples, the memory system controller 215 may selectively suspend an execution of write and erase operations for a memory device 240 (e.g., by entering a program suspend mode). That is, executing write and erase operations at the memory device 240 may take more time compared to executing read operations at the memory device 240. For example, executing a write operation at the memory device 240 may take between one and twenty ms while executing a read operation may take around ten μs. By entering the program suspend mode, the memory system controller 215 may suspend write and erase operations while continuing to execute read operations at the memory device 240. Thus, a read execution latency associated with the memory device 240 may decrease during the program suspend mode.

In some instances, the memory system controller 215 may enter the program suspend mode based on or in response to a preconfigured setting. For example, the memory system 210 may enter the program suspend mode based on or in response to a hardcoded setting in the firmware of the memory system 210. In cases of a mixed workload (e.g., the memory system 210 has read operations, write operations, and erase operations to execute), entering the program suspend mode according to the preconfigured setting may not improve an overall performance of the memory system 210. That is, in cases that the memory system 210 is executing operations associated with a large quantity of write operations (e.g., video recording), entering the program suspend mode according to the preconfigured setting may significantly impact the performance of the memory system 210 and the user experience.

In the example of system 200, the host system 205 may indicate, to the memory system 210, to operate according to a mode of operation associated with a decreased write operation latency. For example, in cases that the host system 205 is relying on the memory system 210 to perform a workload associated with more write operations than read operations (e.g., for video recording), the host system 205 may indicate for the memory system 210 to operate according to the mode of operation associated with the decreased write operation latency. The host system 205 may indicate for the memory system 210 to operate according to the mode of operation associated with the decreased write operation latency by transmitting a command (e.g., to the memory system controller 215 via the interface 220) or setting a register at the memory system 210 (e.g., located within the interface 220) to a value indicating the mode of operation associated with the decreased write operation latency. In response to the memory system 210 receiving, from the host system 205, the indication to operate according to the mode of operation associated with decreased write operation latency, the memory system 210 may switch from a first mode of operation (e.g., associated with entering the program suspend mode according to a preconfigured setting) to a second mode of operation (e.g., associated with limiting the suspension of write operations). Thus, the memory system 210 performance may improve (e.g., by limiting the suspension of write operations). In some cases, the host system 205 may subsequently indicate, to the memory system 210, to switch back to the first mode of operation where the memory system 210 enters the program suspend mode according to the preconfigured setting.

The memory system controller 215 may additionally be configured for operations associated with the memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. That is, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the above operations in conjunction with or instead of the memory system controller 215. In some cases, the memory system controller 215 may perform the functions of the storage controller 230 and the storage controller 230 may be omitted.

FIG. 3 illustrates an example of a process flow 300 that supports read latency and suspend modes in accordance with examples as disclosed herein. The process flow 300 may implement aspects of the systems 100 and 200 as described with reference to FIGS. 1 and 2. For example, the memory system 310 and the host system 305 may be examples of the memory systems and the host systems as described with reference to FIGS. 1 and 2. Aspects of the process flow 300 may be implemented by a controller, among other components. Additionally or alternatively, aspects of the process flow 300 may be implemented as instructions stored in memory (e.g., firmware stored in a memory coupled with the host system 305 or memory system 310). For example, the instructions, when executed by a controller (e.g., the memory system controller, the local controller, the host system controller), may cause the controller to perform the operations of the process flow 300.

At 315, the memory system 310 may be operated according to a first mode of operation. Here, the memory system 310 may operate according to the first mode of operation by executing read operations, executing write operations, and suspending write operations. That is, while operating according to the first mode operation, the memory system 310 may elect to suspend write operations and erase operations (e.g., by entering a program suspend mode) based on or in response to a firmware of the memory system 310. In response to the memory system 310 determining to enter the program suspend mode, the memory system may suspend the execution of write operations, erase operations, or both. In some cases, the memory system 310 may operate according to the program suspend mode for a set or determined time period (e.g., indicated by the firmware of the memory system 310). Additionally or alternatively, the memory system 310 may operate according to the program suspend mode until a set or determined quantity of read operations are executed (e.g., the set or determined quantity of read operations indicated by the firmware of the memory system 310). After the time period or the quantity of read operations are executed, the memory system 310 may exit the program suspend mode and continue executing operations (e.g., read operations, write operations, erase operations) based on or in response to an order as described with reference to FIG. 2.

At 320, an indication of a write execution latency may be transmitted, by the memory system 310, to the host system 305. That is, the memory system 310 may optionally transmit the indication of a write execution latency based on or in response to operating the memory system 310 according to the first mode of operation. In some cases, the write execution latency may be based on or in response to an amount of time that the memory system 310 spends in the program suspend mode while operating according to the first mode of operation. That is, the write execution latency may increase as the amount of time that the memory system 310 spends in the program suspend mode increases. Additionally, the write execution latency may decrease as the amount of time that the memory system 310 spends in the program suspend mode decreases.

At 325, a write execution latency associated with the memory system 310 may be identified by the host system 305. In some cases, the host system 305 may identify the write execution latency associated with the memory system 310 based on or in response to receiving the indication of the write execution latency from the memory system 310 at 320. In some other cases (e.g., in cases that the memory system 310 does not transmit the write execution latency indication to the host system 305 at 320), the host system 305 may identify the write execution latency based on or in response to a performance of the memory system 310. For example, the memory system 310 may indicate, to the host system 305, in response to an execution of write commands is complete. Here, the host system 305 may identify the write execution latency based on or in response to an amount of time between transmitting the write commands to the memory system 310 and receiving the indication of completion of the write commands from the memory system 310. In another example, the memory system 310 may indicate, to the host system 305, a capacity to receive and execute write commands. Here, the host system 305 may identify the write execution latency based on or in response to the indicated capacity of the memory system 310 to receive and execute write commands.

Based on or in response to identifying the write execution latency associated with the memory system 310 at 325, the host system may determine to indicate, to the memory system 310, to switch to a second mode of operation associated with a decreased latency for executing write operations based on or in response to limiting a suspending write operations. For example, the host system 305 may determine whether the write execution latency exceeds a threshold. Additionally or alternatively, the host system 305 may determine whether a workload of the memory system 310 may be associated with a large quantity of write operations (e.g., compared to a quantity of read operations). For example, the host system 305 may determine that the memory system 310 may be executing operations associated with video recording (e.g., which is associated with a large quantity of write operations compared to a quantity of read operations). Here, the host system 305 may determine to prioritize a write execution latency over a read execution latency (e.g., to improve a performance of the memory system 310, to improve a user experience) by indicating for the memory system 310 to switch to the second mode of operation associated with the decreased latency for executing write operations.

At 330, an indication to switch to a second mode of operation associated with the decreased latency for executing write operations based on or in response to limiting the suspending write operations may be transmitted by the host system 305 to the memory system 310. That is, the second mode of operation may limit the memory system 310 from operating in a program suspend mode (e.g., where the memory system 310 suspends the execution of write operations, erase operations, or both). In one example, the host system 305 may indicate for the memory system 310 to switch to the second mode of operation by writing a value including the indication to a register at the memory system (e.g., setting a flag to indicate for the memory system 310 to switch to the second mode of operation). Here, the memory system 310 may poll the register and determine to switch to the second mode of operation based on or in response to the register storing the value indicating for the memory system 310 to switch to the second mode of operation. In another example, the host system 305 may indicate for the memory system 310 to switch to the second mode of operation by transmitting, to the memory system 310, a command including the indication to switch to the second mode of operation.

At 335, the second mode of operation may optionally be selected by the memory system 310 from multiple modes of operation that are each associated with the decreased latency for executing write operations based on or in response to limiting the suspending write operations. That is, the memory system 310 may be configured to operate according to multiple different modes of operation that limit write operation suspensions (e.g., limit the program suspend mode). For example, the memory system 310 may be configured to operate according to one mode of operation that disables the suspension of write operations, one mode that significantly decreases the suspension of write operations, and one mode that slightly decreases the suspension of write operations (e.g., compared to the first mode of operation). Here, the memory system 310 may select the second mode of operation from one of the possible modes of operation that limits the suspending write operations (e.g., based on or in response to the host system 305 indicating one of the possible modes of operation, based on or in response to the predicted workload of the memory system 310, based on or in response to past operations of the memory system 310).

At 340, the memory system 310 may be operated according to the second mode of operation based on or in response to receiving the indication from the host system 305 at 330. In cases that the memory system 310 selects the second mode of operation from multiple modes of operation that are each associated with the decreased latency for executing write operations (e.g., at 335), the memory system 310 may operate according to the selected second mode of operation at 340. In some instances, the memory system 310 may operate according to the second mode of operation without receiving the indication from the host system at 330. That is, the memory system 310 may determine to operate the memory system 310 according to the second mode of operation based on or in response to a workload or projected workload (e.g., a set of commands or predicted set of commands) to be executed by the memory system 310.

In one example, the second mode of operation may limit the suspension of write operations by disabling the suspension of write operations, disabling the suspension of erase operations, or disabling the suspension of write operations and erase operations (e.g., disabling the program suspend mode). Here, the memory system 310 may operate according to the second mode of operation by disabling the suspension of write operations. Thus, the memory system 310 may operate according to the second mode of operation by performing read operations and executing write operations.

In another example, the second mode of operation may limit the suspension of write operations by limiting the quantity of write operation suspensions while operating the memory system 310 according to the second mode of operation. For instance, the second mode of operation may be associated with a threshold quantity of write operation suspensions (or a threshold quantity of program suspend mode entries). In some cases, the host system 305 may indicate the threshold quantity of write operation suspensions associated with the second mode of operation within the indication to switch to the second mode of operation. In some other cases, the memory system 310 may identify the threshold quantity of write operation suspensions associated with the second mode of operation at 335 (e.g., based on or in response to the predicted workload of the memory system 310, based on or in response to past operations of the memory system 310). Additionally or alternatively, the second mode of operation may be associated with a maximum quantity of write operation suspensions for each write operation execution. In either instance, the memory system 310 may operate according to the second mode of operation by identifying the threshold quantity of write operation suspensions and suspending a quantity of write operations that is less than the threshold quantity of write operation suspensions (e.g., while the memory system 310 is operating according to the second mode of operation). Here, the memory system 310 may operate according to the second mode of operation by executing read operations, executing write operations, and suspending a quantity of write operations that is less than the threshold quantity of write operation suspensions.

In another example, the second mode of operation may limit the suspension of write operations by limiting a quantity of read operations performed during each program suspend mode (e.g., during each write suspension duration).

For instance, the second mode of operation may be associated with a threshold quantity of read operations performed during each program suspend mode (e.g., during each write suspension duration). In some cases, the host system 305 may indicate the threshold quantity of read operations associated with the second mode of operation within the indication to switch to the second mode of operation. In some other cases, the memory system 310 may identify the threshold quantity of read operations associated with the second mode of operation at 335 (e.g., based on or in response to the predicted workload of the memory system 310, based on or in response to past operations of the memory system 310). The memory system 310 may operate according to the second mode of operation by identifying the threshold quantity of read operations performed during the write suspension duration and performing less than the quantity of threshold read operations while suspending write operations while operating according to the second mode of operation. That is, the memory system 310 may operate according to the second mode of operation by executing read operations, executing write operations, and executing fewer read operations than the threshold quantity of read operations while suspending write operations.

In another example, the second mode of operation may limit the overhead associated with the suspension and resume of write operations by changing settings associated with the memory system 310 (e.g., the preconfigured settings associated with entering the program suspend mode). That is, the memory system 310 may include firmware that triggers the memory system 310 to enter the program suspend mode for a time period (e.g., to suspend write operations, to suspend erase operations, to suspend write operations and erase operations) while operating the memory system 310 according to the first mode of operation. In some instances, the second mode of operation may limit the suspension of write operations by decreasing the quantity of triggers for entering the program suspend mode (e.g., enabling more or less check points to and reducing a write operation latency). The memory system 310 may operate according to the second mode of operation by decreasing the quantity of triggers associated with suspending write operations to limit the suspending write operations. Here, the memory system 310 may operate according to the second mode of operation by executing read operations, executing write operations, and suspending write operations in response to the decreased quantity of triggers.

In another example, the second mode of operation may limit the suspension of write operations by enabling a cache associated with executing write operations. That is, the memory system 310 may enable or disable a write cache (e.g., a program cache) to increase a write execution performance at the cost of longer suspend execution latency. Here, the memory system 310 may operate according to the second mode of operation based on or in response to enabling the cache.

At 345, based on or in response to transmitting the indication at 330, whether the write execution latency associated with the memory system 310 (e.g., operating according to the second mode of operation) is less than the write execution latency associated with the memory system 310 identified at 325 (e.g., while the memory system 310 was operating according to the first mode of operation) may be determined by the host system 305. In some cases, the host system 305 may determine that the write executing latency associated with the memory system 310 has decreased based on or in response to the memory system 310 operating according to the second mode of operation that is associated with the decreased latency for executing write operations. In some cases, the host system 305 may identify the write execution latency associated with the memory system 310 based on or in response to receiving the indication of the write execution latency from the memory system 310 (e.g., after 340). In some other cases (e.g., in cases that the memory system 310 does not transmit the write execution latency indication to the host system 305 at 320), the host system 305 may identify the write execution latency based on or in response to a performance of the memory system 310. For example, the memory system 310 may indicate, to the host system 305, in response to an execution of write commands is complete. Here, the host system 305 may identify the write execution latency based on or in response to an amount of time between transmitting the write commands to the memory system 310 and receiving the indication of completion of the write commands from the memory system 310. In another example, the memory system 310 may indicate, to the host system 305, a capacity to receive and execute write commands. Here, the host system 305 may identify the write execution latency based on or in response to the indicated capacity of the memory system 310 to receive and execute write commands.

At 350, an indication to switch to the first mode of operation may optionally be transmitted by the host system 305 to the memory system 310. For example, the host system 305 may determine (e.g., at 345) whether the write execution latency status of the memory system 310 has decreased. Additionally or alternatively, the host system 305 may determine whether a workload of the memory system 310 may not be associated with a large quantity of write operations (e.g., compared to read operations). For example, the host system 305 may determine that the memory system 310 may be executing operations associated with video streaming (e.g., which is associated with a large quantity of read operations compared to a quantity of write operations).

In either case, the host system 305 may determine to prioritize a read execution latency over a write execution latency and may thus transmit the indication, to the memory system, to operate according to the first mode of operation (e.g., which does not limit the suspension of write operations). For example, the host system 305 may transmit a command to the memory system 310 including the indication to switch to the first mode of operation. In another example, the host system 305 may write, to the register at the memory system 310, a value including the indication to switch to the first mode of operation.

At 355, the memory system 310 may optionally be operated according to the first mode of operation (e.g., in cases that the memory system 310 receives the indication to switch to the first mode of operation from the host system 305 at 350). While operating according to the first mode operation, the memory system 310 may elect to suspend write operations and erase operations (e.g., by entering a program suspend mode) based on or in response to the settings included in the firmware of the memory system 310.

Figure 4:
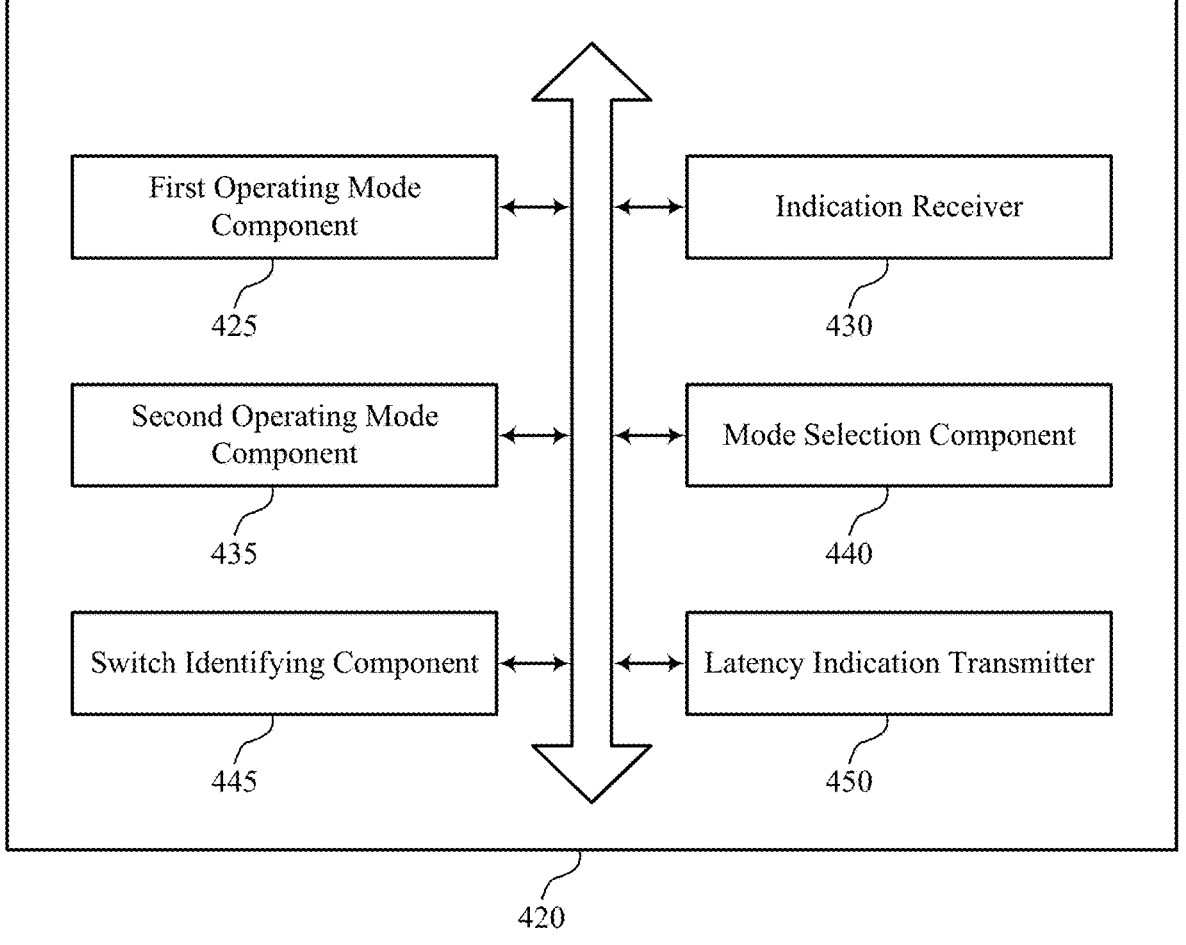
FIG. 4 shows a block diagram of a memory system that supports read latency and suspend modes in accordance with examples as disclosed herein.

FIG. 4 shows a block diagram 400 of a memory system 420 that supports read latency and suspend modes in accordance with examples as disclosed herein. The memory system 420 may be an example of aspects of a memory system as described with reference to FIGS. 1 through 3. The memory system 420, or various components thereof, may be an example of means for performing various aspects of read latency and suspend modes as described herein. For example, the memory system 420 may include a first operating mode component 425, an indication receiver 430, a second operating mode component 435, a mode selection component 440, a switch identifying component 445, a latency indication transmitter 450, or any combination thereof. Each of these components may communicate, directly or indirectly, with one another (e.g., via one or more buses).

The first operating mode component 425 may be configured as or otherwise support a means for operating a memory system according to a first mode of operation associated with a first set of access operations including executing read operations, executing write operations, and suspending write operations. The indication receiver 430 may be configured as or otherwise support a means for receiving, from a host system based at least in part on operating the memory system according to the first mode of operation, an indication to switch to a second mode of operation associated with a decreased latency for executing write operations based at least in part on limiting the suspending write operations. The second operating mode component 435 may be configured as or otherwise support a means for operating the memory system according to the second mode of operation based at least in part on receiving the indication.

In some examples, the mode selection component 440 may be configured as or otherwise support a means for selecting, from multiple modes of operation that are each associated with the decreased latency for executing write operations based at least in part on limiting the suspending write operations, the second mode of operation based at least in part on receiving the indication to switch to the second mode of operation, where operating the memory system according to the second mode of operation is based at least in part on the selecting.

In some examples, the second operating mode component 435 may be configured as or otherwise support a means for disabling a suspension of write operations based at least in part on limiting the suspending write operations, where operating the memory system according to the second mode of operation is based at least in part on the disabling and includes performing read operations and executing write operations.

In some examples, the second operating mode component 435 may be configured as or otherwise support a means for identifying a threshold quantity of write operation suspensions for limiting the suspending write operations based at least in part on receiving the indication to switch to the second mode of operation, where the second mode of operation is associated with a second set of access operations including executing read operations, executing write operations, and suspending a quantity of write operations that is less than the threshold quantity of write operation suspensions.

In some examples, the second operating mode component 435 may be configured as or otherwise support a means for identifying a threshold quantity of read operations performed during a write suspension duration, the threshold quantity of read operations to limit the suspending write operations based at least in part on receiving the indication to switch to the second mode of operation, where the second mode of operation is associated with a second set of access operations including executing read operations, executing write operations, and executing fewer read operations than the threshold quantity of read operations while suspending write operations.

In some examples, the second operating mode component 435 may be configured as or otherwise support a means for decreasing a quantity of triggers associated with suspending write operations to limit the suspending write operations based at least in part on receiving the indication to switch to the second mode of operation, where the second mode of operation is associated with a second set of access operations including executing read operations, executing write operations, and suspending write operations in response to the decreased quantity of triggers.

In some examples, to support receiving the indication to switch to the second mode of operation, the switch identifying component 445 may be configured as or otherwise support a means for identifying that a register at the memory system is storing a value including the indication to switch to the second mode of operation.

In some examples, to support receiving the indication to switch to the second mode of operation, the indication receiver 430 may be configured as or otherwise support a means for receiving a command including the indication to switch to the second mode of operation.

In some examples, the second operating mode component 435 may be configured as or otherwise support a means for enabling a cache associated with executing the write operations based at least in part on receiving the indication to switch to the second mode of operation, where operating the memory system according to the second mode of operation is based at least in part on enabling the cache.

In some examples, the latency indication transmitter 450 may be configured as or otherwise support a means for transmitting, to the host system, a second indication of a write execution latency based at least in part on operating the memory system according to the first mode of operation, where receiving the indication to switch to the second mode of operation is based at least in part on transmitting the second indication of the write execution latency.

In some examples, the first set of access operations includes suspending erase operations. In some examples, the second mode of operation is associated with a decreased latency for executing erase operations based at least in part on limiting the suspending erase operations.

Figure 5:
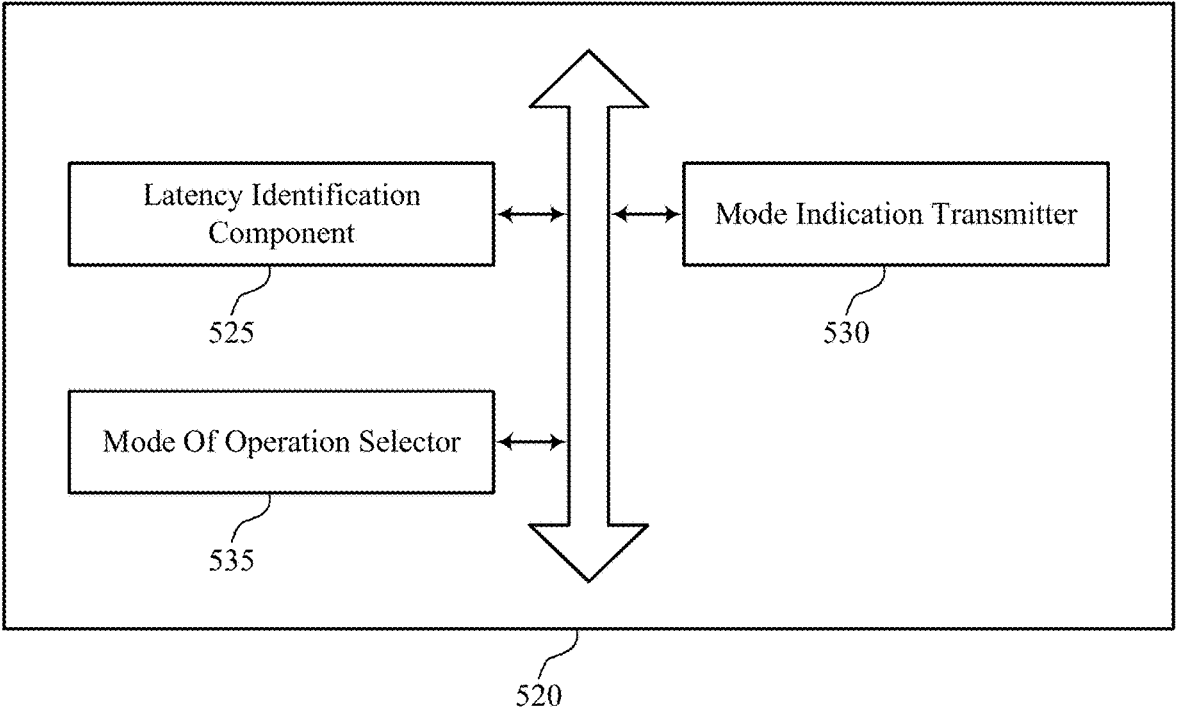
FIG. 5 shows a block diagram of a host system that supports read latency and suspend modes in accordance with examples as disclosed herein.

FIG. 5 shows a block diagram 500 of a host system 520 that supports read latency and suspend modes in accordance with examples as disclosed herein. The host system 520 may be an example of aspects of a host system as described with reference to FIGS. 1 through 3. The host system 520, or various components thereof, may be an example of means for performing various aspects of read latency and suspend modes as described herein. For example, the host system 520 may include a latency identification component 525, a mode indication transmitter 530, a mode of operation selector 535, or any combination thereof. Each of these components may communicate, directly or indirectly, with one another (e.g., via one or more buses).

The latency identification component 525 may be configured as or otherwise support a means for identifying a first write execution latency associated with a memory system that is operating according to a first mode of operation associated with a first set of access operations including executing read operations, executing write operations, and suspending write operations. The mode indication transmitter 530 may be configured as or otherwise support a means for transmitting, to the memory system based at least in part on the identifying, an indication to switch to a second mode of operation associated with a decreased latency for executing write operations based at least in part on limiting the suspending write operations. In some examples, the latency identification component 525 may be configured as or otherwise support a means for determining, based at least in part on transmitting the indication, whether a second write execution latency associated with the memory system that is operating according to the second mode of operation is less than the first write execution latency.

In some examples, to support transmitting the indication to switch to the second mode of operation, the mode indication transmitter 530 may be configured as or otherwise support a means for writing, to a register at the memory system, a value including the indication to switch to the second mode of operation.

In some examples, to support transmitting the indication to switch to the second mode of operation, the mode indication transmitter 530 may be configured as or otherwise support a means for transmitting a command including the indication to switch to the second mode of operation.

In some examples, the latency identification component 525 may be configured as or otherwise support a means for receiving, from the memory system, a second indication of the first write execution latency, where identifying the first write execution latency is based at least in part on receiving the second indication.

In some examples, the mode of operation selector 535 may be configured as or otherwise support a means for determining whether the first write execution latency exceeds a threshold, where transmitting the indication to switch to the second mode of operation is based at least in part on determining that the first write execution latency exceeds the threshold.

FIG. 6 shows a flowchart illustrating a method 600 that supports read latency and suspend modes in accordance with examples as disclosed herein. The operations of method 600 may be implemented by a memory system or its components as described herein. For example, the operations of method 600 may be performed by a memory system as described with reference to FIGS. 1 through 4. In some examples, a memory system may execute a set of instructions to control the functional elements of the device to perform the described functions. Additionally or alternatively, the memory system may perform aspects of the described functions using special-purpose hardware.

At 605, the method may include operating a memory system according to a first mode of operation associated with a first set of access operations including executing read operations, executing write operations, and suspending write operations. The operations of 605 may be performed in accordance with examples as disclosed herein. In some examples, aspects of the operations of 605 may be performed by a first operating mode component 425 as described with reference to FIG. 4.

At 610, the method may include receiving, from a host system based at least in part on operating the memory system according to the first mode of operation, an indication to switch to a second mode of operation associated with a decreased latency for executing write operations based at least in part on limiting the suspending write operations. The operations of 610 may be performed in accordance with examples as disclosed herein. In some examples, aspects of the operations of 610 may be performed by an indication receiver 430 as described with reference to FIG. 4.

At 615, the method may include operating the memory system according to the second mode of operation based at least in part on receiving the indication. The operations of 615 may be performed in accordance with examples as disclosed herein. In some examples, aspects of the operations of 615 may be performed by a second operating mode component 435 as described with reference to FIG. 4.

In some examples, an apparatus as described herein may perform a method or methods, such as the method 600. The apparatus may include, features, circuitry, logic, means, or instructions (e.g., a non-transitory computer-readable medium storing instructions executable by a processor) for operating a memory system according to a first mode of operation associated with a first set of access operations including executing read operations, executing write operations, and suspending write operations, receiving, from a host system based at least in part on operating the memory system according to the first mode of operation, an indication to switch to a second mode of operation associated with a decreased latency for executing write operations based at least in part on limiting the suspending write operations, and operating the memory system according to the second mode of operation based at least in part on receiving the indication.

Some examples of the method 600 and the apparatus described herein may further include operations, features, circuitry, logic, means, or instructions for selecting, from multiple modes of operation that may be each associated with the decreased latency for executing write operations based at least in part on limiting the suspending write operations, the second mode of operation based at least in part on receiving the indication to switch to the second mode of operation, where operating the memory system according to the second mode of operation may be based at least in part on the selecting.

Some examples of the method 600 and the apparatus described herein may further include operations, features, circuitry, logic, means, or instructions for disabling a suspension of write operations based at least in part on limiting the suspending write operations, where operating the memory system according to the second mode of operation may be based at least in part on the disabling and includes performing read operations and executing write operations.

Some examples of the method 600 and the apparatus described herein may further include operations, features, circuitry, logic, means, or instructions for identifying a threshold quantity of write operation suspensions for limiting the suspending write operations based at least in part on receiving the indication to switch to the second mode of operation, where the second mode of operation may be associated with a second set of access operations including executing read operations, executing write operations, and suspending a quantity of write operations that may be less than the threshold quantity of write operation suspensions.

Some examples of the method 600 and the apparatus described herein may further include operations, features, circuitry, logic, means, or instructions for identifying a threshold quantity of read operations performed during a write suspension duration, the threshold quantity of read operations to limit the suspending write operations based at least in part on receiving the indication to switch to the second mode of operation, where the second mode of operation may be associated with a second set of access operations including executing read operations, executing write operations, and executing fewer read operations than the threshold quantity of read operations while suspending write operations.

Some examples of the method 600 and the apparatus described herein may further include operations, features, circuitry, logic, means, or instructions for decreasing a quantity of triggers associated with suspending write operations to limit the suspending write operations based at least in part on receiving the indication to switch to the second mode of operation, where the second mode of operation may be associated with a second set of access operations including executing read operations, executing write operations, and suspending write operations in response to the decreased quantity of triggers.

In some examples of the method 600 and the apparatus described herein, receiving the indication to switch to the second mode of operation may include operations, features, circuitry, logic, means, or instructions for identifying that a register at the memory system may be storing a value including the indication to switch to the second mode of operation.

In some examples of the method 600 and the apparatus described herein, receiving the indication to switch to the second mode of operation may include operations, features, circuitry, logic, means, or instructions for receiving a command including the indication to switch to the second mode of operation.

Some examples of the method 600 and the apparatus described herein may further include operations, features, circuitry, logic, means, or instructions for enabling a cache associated with executing the write operations based at least in part on receiving the indication to switch to the second mode of operation, where operating the memory system according to the second mode of operation may be based at least in part on enabling the cache.

Some examples of the method 600 and the apparatus described herein may further include operations, features, circuitry, logic, means, or instructions for transmitting, to the host system, a second indication of a write execution latency based at least in part on operating the memory system according to the first mode of operation, where receiving the indication to switch to the second mode of operation may be based at least in part on transmitting the second indication of the write execution latency.

In some examples of the method 600 and the apparatus described herein, the first set of access operations includes suspending erase operations and the second mode of operation may be associated with a decreased latency for executing erase operations based at least in part on limiting the suspending erase operations.

FIG. 7 shows a flowchart illustrating a method 700 that supports read latency and suspend modes in accordance with examples as disclosed herein. The operations of method 700 may be implemented by a host system or its components as described herein. For example, the operations of method 700 may be performed by a host system as described with reference to FIGS. 1 through 3 and 5. In some examples, a host system may execute a set of instructions to control the functional elements of the device to perform the described functions. Additionally or alternatively, the host system may perform aspects of the described functions using special-purpose hardware.

At 705, the method may include identifying a first write execution latency associated with a memory system that is operating according to a first mode of operation associated with a first set of access operations including executing read operations, executing write operations, and suspending write operations. The operations of 705 may be performed in accordance with examples as disclosed herein. In some examples, aspects of the operations of 705 may be performed by a latency identification component 525 as described with reference to FIG. 5.

At 710, the method may include transmitting, to the memory system based at least in part on the identifying, an indication to switch to a second mode of operation associated with a decreased latency for executing write operations based at least in part on limiting the suspending write operations. The operations of 710 may be performed in accordance with examples as disclosed herein. In some examples, aspects of the operations of 710 may be performed by a mode indication transmitter 530 as described with reference to FIG. 5.

At 715, the method may include determining, based at least in part on transmitting the indication, whether a second write execution latency associated with the memory system that is operating according to the second mode of operation is less than the first write execution latency. The operations of 715 may be performed in accordance with examples as disclosed herein. In some examples, aspects of the operations of 715 may be performed by a latency identification component 525 as described with reference to FIG. 5.

In some examples, an apparatus as described herein may perform a method or methods, such as the method 700. The apparatus may include, features, circuitry, logic, means, or instructions (e.g., a non-transitory computer-readable medium storing instructions executable by a processor) for identifying a first write execution latency associated with a memory system that is operating according to a first mode of operation associated with a first set of access operations including executing read operations, executing write operations, and suspending write operations, transmitting, to the memory system based at least in part on the identifying, an indication to switch to a second mode of operation associated with a decreased latency for executing write operations based at least in part on limiting the suspending write operations, and determining, based at least in part on transmitting the indication, whether a second write execution latency associated with the memory system that is operating according to the second mode of operation is less than the first write execution latency.

In some examples of the method 700 and the apparatus described herein, transmitting the indication to switch to the second mode of operation may include operations, features, circuitry, logic, means, or instructions for writing, to a register at the memory system, a value including the indication to switch to the second mode of operation.

In some examples of the method 700 and the apparatus described herein, transmitting the indication to switch to the second mode of operation may include operations, features, circuitry, logic, means, or instructions for transmitting a command including the indication to switch to the second mode of operation.

Some examples of the method 700 and the apparatus described herein may further include operations, features, circuitry, logic, means, or instructions for receiving, from the memory system, a second indication of the first write execution latency, where identifying the first write execution latency may be based at least in part on receiving the second indication.

Some examples of the method 700 and the apparatus described herein may further include operations, features, circuitry, logic, means, or instructions for determining whether the first write execution latency exceeds a threshold, where transmitting the indication to switch to the second mode of operation may be based at least in part on determining that the first write execution latency exceeds the threshold.

It should be noted that the methods described above describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial materials of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A memory system, comprising:

one or more memory devices; and processing circuitry coupled with the one or more memory devices and configured to cause the memory system to:

operate the memory system in a first mode of operation associated with a decreased latency for executing write operations in accordance with a limit to suspension of write operations performed by the memory system, wherein operating in accordance with the first mode of operation is in response to comparing a quantity of read operations performed during a write suspension duration with a threshold that is stored in a register of the memory system and is associated with the limit to suspension of the write operations;

transmit an indication of a first write execution latency according to the first mode of operation;

receive, in response to transmitting the indication, an indication to switch to a second mode of operation that reduces the limit to suspension of the write operations; and operate the memory system in accordance with the second mode of operation based at least in part on receiving the indication.

2. The memory system of claim 1, wherein the processing circuitry is further configured to cause the memory system to:

transmit, prior to operating the memory system in accordance with the first mode of operation, an indication of a second write execution latency of the memory system, wherein the indication to switch to the second mode is received in response to the first write execution latency being less than the second write execution latency.

3. The memory system of claim 1, wherein the processing circuitry is configured to cause the memory system to:

receive one or more write commands from a host system prior to operating the memory system in accordance with the first mode of operation, wherein the indication of the first write execution latency comprises an indication that the memory system has completed an execution of the one or more write commands, and wherein the indication to switch to the second mode is received in response to a duration between receiving the one or more write commands and transmitting the indication of the first write execution latency.

4. The memory system of claim 1, wherein the processing circuitry is configured to cause the memory system to:

transmit an indication of a capacity of the memory system to receive one or more write commands, to execute one or more write commands, or both, wherein the indication to switch to the second mode is received in response to transmitting the indication of the capacity.

5. The memory system of claim 1, wherein the indication to switch to the second mode is received in response to a workload of the memory system comprising a quantity of write operations that satisfies a threshold quantity of write operations.

6. The memory system of claim 1, wherein, to receive the indication to switch to the second mode of operation, the processing circuitry is configured to cause the memory system to:

receive a command comprising the indication to switch to the second mode of operation; or identify that a value of a second register of the memory system comprises the indication to switch to the second mode of operation, the value of the second register being written by a host system.

7. A non-transitory computer-readable medium storing code comprising instructions which, when executed by processing circuitry of an electronic device, cause the electronic device to:

operate a memory system in a first mode of operation associated with a decreased latency for executing write operations in accordance with a limit to suspension of write operations performed by the memory system, wherein operating in accordance with the first mode of operation is in response to comparing a quantity of read operations performed during a write suspension duration with a threshold that is stored in a register of the memory system and is associated with the limit to suspension of the write operations;

transmit an indication of a first write execution latency according to the first mode of operation;

receive, in response to transmitting the indication, an indication to switch to a second mode of operation that reduces the limit to suspension of the write operations; and operate the memory system in accordance with the second mode of operation based at least in part on receiving the indication.

8. The non-transitory computer-readable medium of claim 7, wherein the instructions, when executed by the processing circuitry of the electronic device, further cause the electronic device to:

transmit, prior to operating the memory system in accordance with the first mode of operation, an indication of a second write execution latency of the memory system, wherein the indication to switch to the second mode is received in response to the first write execution latency being less than the second write execution latency.

9. The non-transitory computer-readable medium of claim 7, wherein the instructions, when executed by the processing circuitry of the electronic device, further cause the electronic device to:

receive one or more write commands from a host system prior to operating the memory system in accordance with the first mode of operation, wherein the indication of the first write execution latency comprises an indication that the memory system has completed an execution of the one or more write commands, and wherein the indication to switch to the second mode is received in response to a duration between receiving the one or more write commands and transmitting the indication of the first write execution latency.

10. The non-transitory computer-readable medium of claim 7, wherein the instructions, when executed by the processing circuitry of the electronic device, further cause the electronic device to:

transmit an indication of a capacity of the memory system to receive one or more write commands, to execute one or more write commands, or both, wherein the indication to switch to the second mode is received in response to transmitting the indication of the capacity.

11. The non-transitory computer-readable medium of claim 7, wherein the indication to switch to the second mode is received in response to a workload of the memory system comprising a quantity of write operations that satisfies a threshold quantity of write operations.

12. The non-transitory computer-readable medium of claim 7, wherein the instructions to receive the indication to switch to the second mode of operation, when executed by the processing circuitry of the electronic device, further cause the electronic device to:

receive a command comprising the indication to switch to the second mode of operation; or identify that a value of a second register of the memory system comprises the indication to switch to the second mode of operation, the value of the second register being written by a host system.

13. A memory system, comprising:

one or more memory devices; and processing circuitry coupled with the one or more memory devices and configured to cause the memory system to:

receive an indication to switch to a mode of operation associated with limiting suspending write operations at the memory system;

compare a quantity of read operations performed during a write suspension duration with a threshold associated with limiting the suspending write operations, wherein the threshold is stored in a register at the memory system; and operate the memory system in accordance with the mode of operation in response to receiving the indication and comparing the quantity of read operations with the threshold.

14. The memory system of claim 13, wherein the mode of operation is associated with a set of access operations comprising executing read operations, executing write operations, and executing fewer read operations than the threshold.

15. The memory system of claim 13, wherein the processing circuitry is further configured to cause the memory system to:

select the mode of operation from a plurality of modes of operation configured at the memory system, wherein each of the plurality of modes of operation is associated with a decreased latency for executing write operations in response to limiting the suspending write operations, and wherein operating the memory system in accordance with the mode of operation is in response to the selection.

16. The memory system of claim 15, wherein the mode of operation is selected in response to receiving an indication of the mode of operation from a host system, in response to a predicted workload of the memory system, in response to one or more previous operations performed by the memory system, or a combination thereof.

17. The memory system of claim 13, wherein the processing circuitry is further configured to cause the memory system to:

transmit an indication of a write execution latency to a host system, the write execution latency associated with a duration during which the memory system operates in accordance with a second mode of operation that does not limit suspending write operations, wherein the indication to switch to the mode of operation is received from the host system in response to transmitting the indication of the write execution latency.

18. The memory system of claim 13, wherein the processing circuitry is further configured to cause the memory system to:

compare a quantity of write operation suspensions performed during the mode of operation with a second threshold associated with limiting the suspending write operations, wherein operating the memory system in accordance with the mode of operation is further in response to comparing the quantity of write operation suspensions with the second threshold, and wherein the mode of operation is associated with a set of access operations comprising executing read operations, executing write operations, and suspending a quantity of write operations that is less than the threshold.

19. The memory system of claim 13, wherein the processing circuitry is further configured to cause the memory system to:

receive an indication of the threshold from a host system, wherein comparing the quantity of read operations with the threshold is in response to receiving the indication of the threshold.

20. The memory system of claim 13, wherein the processing circuitry is further configured to cause the memory system to:

identify the threshold in response to a predicted workload of the memory system, in response to one or more previous operations performed by the memory system, or both.

* * * * *